United States Patent [19]

Pearlman et al.

[11] Patent Number: 4,799,239
[45] Date of Patent: Jan. 17, 1989

[54] PHASE-COHERENT FSK SIGNAL DEMODULATOR

[75] Inventors: Sheldon Pearlman, Stanford; Anatoly Fridland, Shelton; Gunther J. Martin, Ridgefield, all of Conn.

[73] Assignee: Kidde, Inc., Westlake, Ohio

[21] Appl. No.: 856,777

[22] Filed: Apr. 28, 1986

[51] Int. Cl.$^4$ .............................................. H04L 27/14
[52] U.S. Cl. ........................................ 375/88; 375/94; 375/95; 329/110
[58] Field of Search ............... 375/88, 91, 94, 96, 375/110, 62, 95, 81, 90, 86; 329/104, 110

[56] References Cited

U.S. PATENT DOCUMENTS

| | | | |
|---|---|---|---|
| 4,280,224 | 7/1981 | Chetnik | 375/95 |
| 4,324,001 | 4/1982 | Rhodes | 375/90 |
| 4,501,002 | 2/1985 | Auchterlonie | 375/86 |
| 4,580,101 | 4/1986 | Lax | 375/91 |
| 4,653,073 | 3/1987 | Vercellotti et al. | 375/92 |

Primary Examiner—Robert L. Griffin
Assistant Examiner—Marianne Huseman
Attorney, Agent, or Firm—Pearne, Gordon, McCoy & Granger

[57] ABSTRACT

A system and process for receiving phase-coherent FSK signals having data and clock components which includes a plurality of subsystems and a means for carrying data among the subsystems. At least two of the subsystems are able to communicate by means of a transmitter in one of them and a receiver in the other. The receiver includes a demodulator for separating the data and clock components of the encoded phase-coherent FSK signals. The clock demodulator includes a first transition detector and a 90-degree phase shift circuit which both receive the encoded signal. A second transition detector receives the output of the phase shift or phase delay circuit. An OR gate receives the output of the first and second transition detectors to produce a four times clock signal. The data component of the phase-coherent FSK signal is recovered by either of two alternate circuits. The first circuit uses a shift register which examines at least four samples of data in conjunction with a pair of exclusive OR gates, a NOR gate, and a flip-flop. An alternate data component demodulator includes a first 90-degree phase delay circuit and an inverter both receiving the encoded data and transmitting it to a first exclusive OR gate. A second 90-degree phase delay circuit receives the output of the first exclusive OR gate. A second exclusive OR gate receives the outputs of both the second phase delay circuit and the first exclusive OR gate.

20 Claims, 5 Drawing Sheets

PHASE-COHERENT FSK SIGNAL DEMODULATOR

BACKGROUND OF THE INVENTION

This invention relates in general to digital data transmissions among different substations or nodes. More specifically, the invention relates to data receiving and demodulation of encoded data signals which have both a data and a clock or reference component.

Many high speed communication systems have nodes which are operatively connected with a single common transmission line. This arrangement implies that only one station or node may communicate with another at any one time. When all nodes have to communicate, the signals arrive in groups. Higher signaling rates are thus necessary which require fast clock recovery circuitry in order to provide accurate signaling.

Traditionally, a modulated data signal was filtered and amplified and then passed to the input of a multiplier. Another circuit removed the clock signal and it was also passed to the input of the multiplier. The clock recovery was often accomplished with a circuit known as a phase lock loop. This circuit, however, had serious shortcomings in high speed data handling because of its iterative method. It generally included relatively complex and expensive circuitry, and required frequent maintenance and tuning. At the higher signal rates, the phase lock loop also had trouble in reproducing accurate error-free information.

Various techniques have been used to transmit and receive encoded data along a common transmission line. None have been completely satisfactory. One such system is illustrated in U.S. Pat. No. 4,287,596, which is hereby incorporated by reference. As explained therein, a technique is used which is known as phase encoded signals with a biphase-level code (Manchester code). While the system had advantages over phase lock loops, it still requires relatively complex circuitry and it is limited for use with phase-encoded signals.

This invention has particularly found a system and method for receiving and demodulating digital information at a node which allows relatively simple circuitry and which yields fast, accurate data and clock recovery. In particular, this invention utilizes a phase-coherent frequency shift keying (FSK) modulated signal which is not described in U.S. Pat. No. 4,287,596.

The accuracy of demodulation and clock recovery in this invention is higher with the use of 90-degree delay lines instead of 270 degrees as used in U.S. Pat. No. 4,287,596. Characteristics of the FSK system are set forth in *An American National Standard,* IEEE Standards for Local Area Networks: Token-Passing Bus Access Method and Physical Layer Specifications. As stated at page 176 therein, FSK is a modulation technique whereby information is impressed upon a carrier by shifting the frequency of the transmitted signal to one of a small set of frequencies. Phase-coherent FSK is a particular form of FSK where the two signaling frequencies are integrally related to the data rate and transitions between the two signaling frequencies are made at zero-crossings of the carrier waveform.

Another key feature of this invention is that it can demodulate either the original signal or its complement (a signal 180 degrees out of phase). The receiver operates in a transparent manner with either the signal or its complement. This feature is particularly important because the signals in large data handling systems are often inadvertently omitted.

Phase-coherent FSK has been found particularly advantageous in handling large quantities of serially produced high speed data. The different carrier frequencies of the FSK signal have a tendency to produce distinctive error-free, noiseless data and clock signals which can be relatively quickly and easily recovered.

SUMMARY OF THE INVENTION

A system for receiving phase-coherent FSK signals having data and clock components, including a plurality of subsystems, and means for carrying the data among the subsystems, is disclosed. At least two of the subsystems communicate with a means for transmitting and a means for receiving phase-coherent FSK signals. The means for receiving includes a data demodulator and a clock demodulator. The clock demodulator includes a plurality of operatively connected transition detectors which generate signals when the phase-coherent FSK data changes states and when a phase-delayed wave of the phase-coherent FSK data changes states. The outputs of the transition detectors are combined to form a multiple of the clock components. A data component demodulation means includes a means for phase-delaying the encoded phase-coherent FSK signal in a non-iterative fashion and means for comparing the phase-delayed signals to generate a signal indicative of the data component.

This invention also includes the process demodulating an encoded phase-coherent FSK signal having data and clock components in a system having a plurality of subsystems and means for carrying signals amoung them. The clock signal is demodulated by detecting the transitions of the phase-coherent FSK signal both before and after it has been phase-delayed and combining the transition signals. The data component of the phase-coherent FSK signal is demodulated by phase-delaying it a plurality of times and comparing the resultant signals in a plurality of exclusive OR gates.

DETAILED DESCRIPTION OF THE PREFERRED EMBODIMENTS

Figure 1:
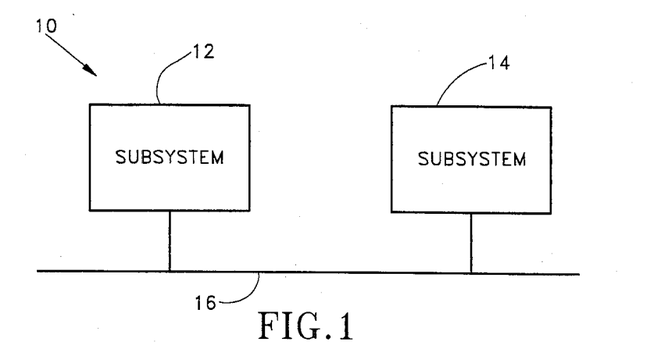
FIG. 1 is a block diagram representation of the system.

A system 10 is illustrated for transmitting and receiving data. At least two subsystems or nodes 12 and 14 are operatively connected by a means for carrying data 16. The subsystems 12 and 14 are capable of both transmitting and receiving data. An example of them is shown in the above-referenced IEEE Standards, which have become well known in the art as a Token Bus Method or "802.4" from its specification number. This specification has been particularly adapted to be used in manufacturing systems known as MAP. Basically, because it is a token bus system, only one node can transmit and only one node can receive at any given time, but each node must be able to effectively communicate with every other node. When the means for carrying 16, which is a coaxial cable, fiber optic for the like, becomes extensive, signals may be transmitted with distortion. One cause of distortion is that high frequencies travel faster than low frequencies, which is the nature of base band high speed systems. If a spectrum of frequencies is used, the actual travel times of the transmissions may cause significant distortion.

FSK transmission significantly reduces such problems. The use of one frequency to transmit "1"'s and another to transmit "0"'s, such as 5 MHZ and 10 MHZ, greatly reduces this problem. During transmission, these frequencies attenuate as the square root of the ratio of the two frequencies. Without going into the calculations, this results in only a 40% difference in attenuation. Moreover, a desirable characteristic of frequency shifting is that outside interference such as lightning has no significant effect on it. Phase-coherent FSK signals have the additional characteristic that the two frequencies align, i.e., the clock signal and the data signal are in phase with each other prior to modulation into an FSK format.

Figure 2:
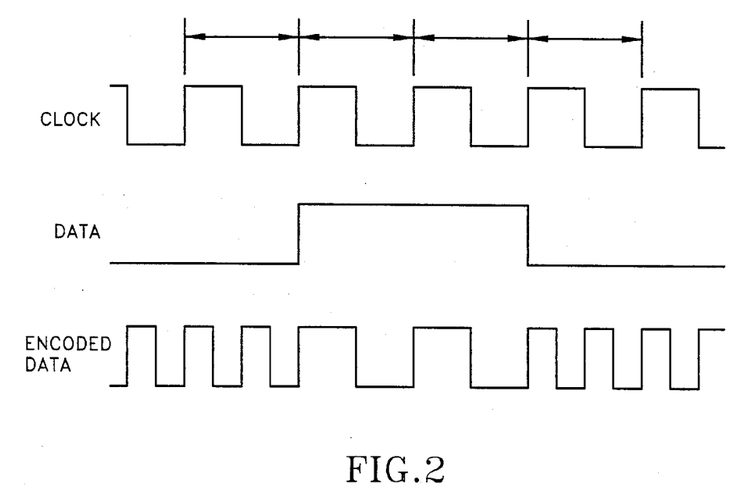
FIG. 2 is a waveform sample of the clock, data, and encoded data signal.

FIG. 2 shows typical phase-coherent FSK waveforms. A clock waveform has a frequency which is typically five MHz but may vary greatly. A data line which is also shown in waveform is combined with the clock wave to form encoded data. There are various circuits well known in the art to combine to form the phase-coherent, FSK modulated signals, but these do not form part of this invention.

A typical circuit would use an input of two times the clock pulse to a flip-flop circuit which, along with the data, would be put into a pair of OR gates feeding a NOR gate. Suffice it to say that the encoded data is typical of the transmissions of encoded phase-coherent FSK signals used in this invention.

Figure 3:
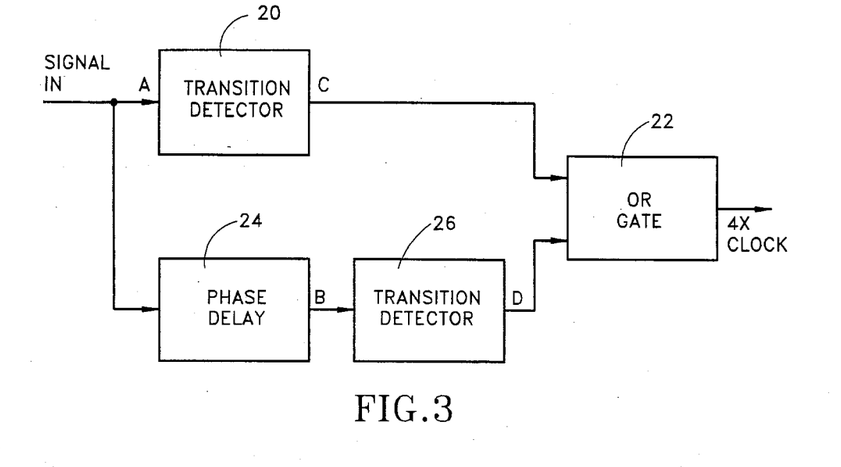
FIG. 3 is a block diagram of the clock component recovery circuit.

FIG. 3 illustrates part of the system for receiving the phase-coherent FSK signals. It represents the demodulation means for the clock component of the signal. A first transition detector 20 receives the encoded FSK signal and is operatively connected to an input of an OR gate 22. The transition detecter 20 may be any one of a number of circuits well known in the art, but is basically an edge detector.

A phase delay circuit 24 is also connected to receive the encoded FSK signal. It may be any one of several types, a typical one being available from Data Delay Lines, Inc., Model DDU-4-5050. A second transition detector 26 is operatively connected to the output of the phase delay circuit 24 and to an input to the OR gate 22.

Figure 4:
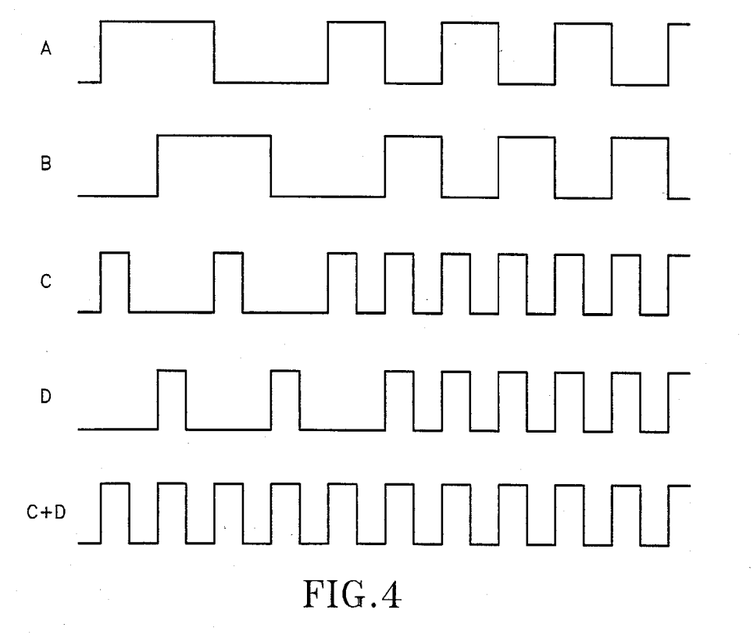
FIG. 4 is a waveform diagram of signals at different places in the circuit of FIG. 3.

The operation of FIG. 3 is represented in FIG. 4. Waveform A represents the encoded phase-coherent FSK waveform that contains both data and clock components. The time period of one clock period is marked above waveform A for reference. Waveform B is the resultant signal after the encoded signal A has been phase-shifted or delayed by 90 degrees. It is conceivable that phase shifts other than 90 degrees may work, but 90 degrees is preferred. The first transition detector 20 transmits signals represented by the waveform C after receiving the encoded data A. Basically, the first transition detector 20 gives a signal every time it sees a change of state in the encoded data A. Similarly, the second transition detector 26 gives a signal every time it sees a transition or change of state in the signals making up waveform B. The two transition signals C and D are then combined in the OR gate 22 to form the signal represented by waveform "C+D." The C+D waveform is four times the clock component. The clock signal that is necessary for decoding is therefore retrieved. If desired, it can be divided by four. It should be noted that a minimum number of components are necessary for the clock recovery.

Figure 5:
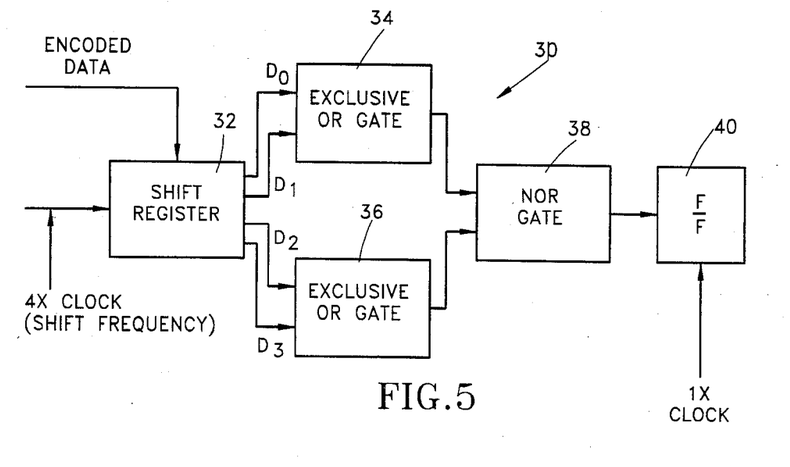
FIG. 5 is a block diagram of one embodiment of the data component demodulator.
Figure 6:
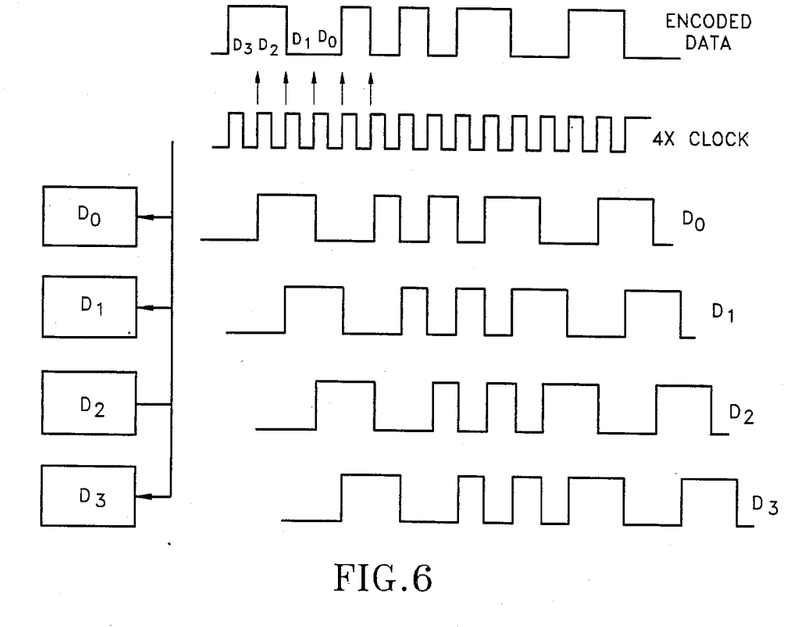
FIG. 6 is a waveform diagram of the input signals to the demodulator of FIG. 5.

FIGS. 5 and 6 represent one embodiment of a data demodulation means 30 which forms part of the means for receiving. A shift register 32 is adapted to receive the encoded data and a four times clock pulse. The shift register 32 which is illustrated has a four-bit capacity, but different capacities could be utilized. A first exclusive OR gate 34 is operatively connected to the shift register 32 to receive a pair of signals from the first two positions therein. A second exclusive OR gate 36 similarly receives signals from the other two positions in the shift register 32. A NOR gate 38 is operatively connected to the outputs of the exclusive OR gates and the input to a flip-flop 40. A one-time clock signal is also an input to the flip-flop 40.

The sequential operation of the demodulation means 30 is shown in FIG. 6. The encoded FSK data signal is fed into the shift register every one-fourth of the clock period and after it has effectively been delayed 90 degrees of the lower shift frequency. That is, viewing the data of FIG. 6 as if it were moving from right to left, data bits $D_3$, $D_2$, $D_1$ and $D_0$ enter the shift register in sequence. $D_3$ would enter the first space in the shift register. The four times clock pulse would then cause the wave to shift 90 degrees, $D_3$ would move to the next position in the shift register, and $D_2$ would enter the first space. In the next two pulses, $D_1$ and $D_0$ would enter the shift register giving the status of the shift register as shown in FIG. 6. Two bits of data $D_0$ and $D_1$ are passed into the first exclusive OR gate and the other two bits $D_2$ and $D_3$ are fed into the second exclusive OR gate. The two resulting signals act as the input to the NOR gate 38 and then to the flip-flop 40. A one time clock pulse trips a flip-flop 40 as it receives the signals. The process is then repeated. The decoded data is the output of the flip-flop 40.

Figure 7:
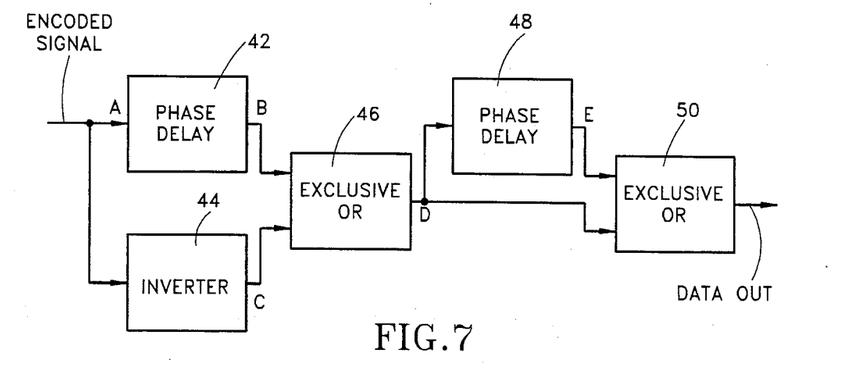
FIG. 7 is a second embodiment of the data component demodulator.
Figure 8A:
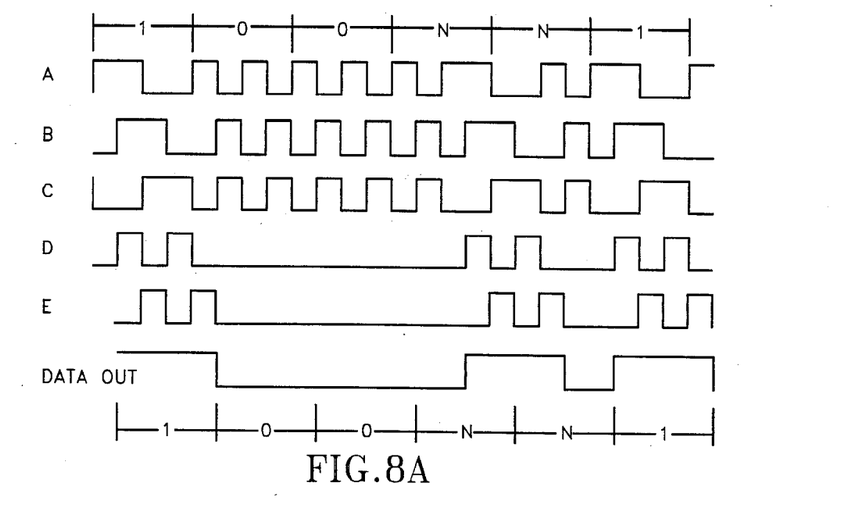
FIGS. 8a and 8b show a waveform and its inversion representing signals at different points in the demodulator of FIG. 7.
Figure 8B:
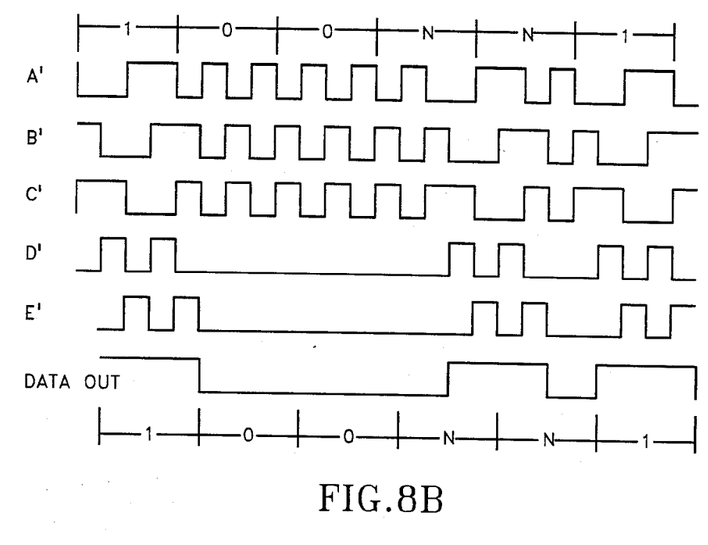

An alternate data demodulation means is illustrated in FIGS. 7 and 8. The encoded data is the input to a first phase delay circuit 42 and an inverter 44. A first exclusive OR gate 46 is operatively connected to the outputs of the phase delay circuit 42 and inverter 44. A second phase delay circuit 48 and a second exclusive OR gate 50 are operatively connected to the output of the exclusive OR gate 46.

The waveforms shown in FIG. 8 illustrate the states of signals as they pass through the circuit of FIG. 7. A typical data-encoded, phase-coherent FSK signal is shown in waveform A. A bit period is illustrated above waveform A. Waveform B illustrates the encoded data signal after it has been shifted 90 degrees and waveform C after the encoded data signal of waveform A has been inverted. D results from combining waveforms B and C in the first exclusive OR gate 46. Waveform D is delayed 90 degrees by the second phase delay circuit 48 to form the information illustrated in waveform E. The data waveform is the output from exclusive OR gate 50 which receives signals D and E. It should be noted that the system only recognizes data as 1 or 0 if there are equal amounts of time in the bit period at the two different states. If there are unequal amounts of time, e.g., three-quarters of a clock period is at 1 and one-quarter at 0, the system does not recognize it as any data and is symbolized by N for "non-data."

FIG. 8b illustrates a feature of this system that is a particular advantage. That is, the system operates and gives the same results whether the input phase-coherent FSK has been shifted 180 degrees or not. The letters A', B', C', D' and E' represent the same manipulations of the waveform as shown in FIG. 8a. Comparison of the Data Out waveforms of FIGS. 8a and 8b shows that they are identical even though the inputs are 180 degrees apart. The system of FIG. 5 has this same capability of accurately demodulating inverted data.

Again, the data is extracted with a relatively small number of components, resulting in clear signals.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A system for receiving phase-coherent FSK signals having data and clock components comprising:
   a plurality of subsystems;
   means for carrying the data among the subsystems;
   at least two of the subsystems being able to communicate by a means for transmitting and a means for receiving phase-coherent FSK signals in the subsystems;
   the means for receiving including demodulation means for the data and clock components, the clock component demodulation means including a plurality of operatively parallel connected transition detectors which generate signals when the entering phase-coherent FSK data changes states and when a phase-delayed wave of the phase-coherent FSK data changes state, wherein the clock component demodulation means includes a means for combining the outputs of the transition detectors and is operatively connected thereto to form a signal which is a multiple of the clock component.

2. The system for receiving phase-coherent FSK signals of claim 1, wherein the clock component demodulation means and transition detectors include a first transistion detector receiving encoded data and a 90-degree phase-delay means receiving the same encoded data.

3. The system for receiving phase-coherent FSK signals of claim 2, wherein the clock component demodulation means includes a second transition detector which receives the output of the 90-degree phase delay, and the outputs of the first and second transition detectors are the input to the means for combining the outputs.

4. The system for receiving phase-coherent FSK signals of claim 3, wherein the means for combining is an OR gate which receives the signals from the transition detectors and converts them to a signal which is four times the clock component of the incoming encoded signal to the means for receiving.

5. The system for receiving phase-coherent FSK signals of claim 4, wherein the phase-coherent FSK signal shift frequencies have one frequency equal to the clock period of the data and the second frequency at twice this clock.

6. The system for receiving phase-coherent FSK signals of claim 1, wherein the means for receiving includes a demodulation means for the data component of the encoded phase-coherent FSK signals, the data component demodulation means including a means for phase-delaying the phase-coherent FSK signal and means for comparing the incoming encoded phase-coherent FSK signal in a non-iterative fashion to generate a signal indicative of the data component.

7. The system for receiving phase-coherent FSK signals of claim 6, wherein the data component demodulation means includes a shift register having a capacity to contain at least four bits of data, the shift register having an input of the encoded data and the clock pulse so that the input to the shift register is the encoded phase-coherent FSK signal and a series of phase-delayed signals of the incoming encoded phase-coherent FSK signal and means for comparing the input signals to the shift register to generate a signal indicative of the data component of the phase-coherent FSK signal or its inverted signal.

8. The system for receiving phase-coherent FSK signals of claim 7, wherein the data component demodulation means includes at least two exclusive OR gates receiving the output of the shift register and being operatively connected thereto.

9. The system for receiving phase-coherent FSK signals of claim 8, wherein the data component demodulation means includes a NOR gate operatively connected to the two exclusive OR gates and receiving the output thereof.

10. The system for receiving phase-coherent FSK signals of claim 9, wherein the data component demodulator further includes a flip-flop operatively attached to and receiving the output from the NOR gate and a clock signal as its input and generating a signal which is the data.

11. The system for receiving phase-coherent FSK signals of claim 6, wherein the data component demodulations means includes a first 90-degree phase delay means, an inverter, and a first exclusive OR gate operatively connected so that the encoded data is the input to the first 90-degree phase delay means and the inverter and their outputs are the input of the first exclusive OR gate.

12. The system for receiving phase-coherent FSK signals of claim 11, wherein the data component demodulation means further includes a second 90-degree phase delay means and a second exclusive OR gate operatively connected so that the output of the first exclusive OR gate is the input to the second 90-degree phase delay means and the input to the second exclusive OR gate and the output of the second exclusive OR gate is the data component.

13. A process for demodulating an encoded phase-coherent FSK signal having data and clock components in a system having a plurality of subsystems and means for carrying signals among them, comprising:
   transmitting a phase-coherent FSK signal from one subsystem to a second subsystem;

detecting the transitions of the phase-coherent FSK signal and generating a first set of transition signals;

detecting the transitions of the phase-coherent FSK signal after it has been phase-delayed and generating a second set of transition signals; and combining the first and second sets of transition signals to generate a representative clock pulse of the phase-coherent FSK signal, wherein the phase-coherent FSK signal is delayed 90 degrees of the lowest frequency.

14. The process of claim 13, wherein the first and second sets of transition signals are added to produce a signal that is four times the clock signal.

15. The process of claim 14, wherein in order to produce the data component of the encoded phase-coherent FSK signal, the signal is sampled at least four times per bit period, each sample being taken after the previous sample has been phase-delayed by 90 degrees.

16. The process of claim 15, wherein the four samples are compared by passing the first two samples through a first exclusive OR gate and the second two samples through a second exclusive OR gate.

17. The process of claim 16, wherein the outputs of the first and second OR gates are passed through a NOR gate.

18. The process of claim 17, wherein the output of the NOR gate is passed through a flip-flop which also has the clock pulse as an input whereby the data component of the phase-coherent FSK is produced.

19. The process of claim 13, wherein the encoded data is delayed 90 degrees and inverted, and the two resulting signals are transmitted to a first exclusive OR gate.

20. The process of claim 19, wherein the output of the first exclusive OR gate is delayed 90 degrees and the output of the first exclusive OR gate and delayed output of the first exclusive OR gate are passed into a second exclusive OR gate which gives an output signal which is the data component of the encoded phase-coherent FSK signal.

* * * * *

UNITED STATES PATENT AND TRADEMARK OFFICE
CERTIFICATE OF CORRECTION

PATENT NO. : 4,799,239

DATED : January 17, 1989

INVENTOR(S) : Sheldon Pearlman, Anatoly Fridland, and Gunther J. Martin

It is certified that error appears in the above-identified patent and that said Letters Patent is hereby corrected as shown below:

Column 1, line 39, "had" should read --has--

Column 2, line 30, "process" should read --process of--

Column 2, line 33, "amoung" should read --among--

Column 6, line 16, after "signal" the following was omitted:
    --and the phase-delayed phase-coherent FSK signal--

Column 6, lines 47 & 48, "demodulations" should read --demodulation--

Signed and Sealed this

Twenty-sixth Day of September, 1989

Attest:

DONALD J. QUIGG

*Attesting Officer*    *Commissioner of Patents and Trademarks*